United States Patent
Nakashima (10) Patent No.: US 9,272,877 B2
(45) Date of Patent: Mar. 1, 2016

(54) OPERATION DEVICE FOR AN ELEVATOR THAT INCLUDES AN ELEVATOR ACCESS RESTRICTION DEVICE

(75) Inventor: Hidenobu Nakashima, Aichi (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 618 days.

(21) Appl. No.: 13/700,585

(22) PCT Filed: Sep. 10, 2010

(86) PCT No.: PCT/JP2010/065598
§ 371 (c)(1),
(2), (4) Date: Nov. 28, 2012

(87) PCT Pub. No.: WO2012/032649
PCT Pub. Date: Mar. 15, 2012

(65) Prior Publication Data
US 2013/0068569 A1    Mar. 21, 2013

(51) Int. Cl.
*B66B 1/20* (2006.01)
*B66B 1/34* (2006.01)
(Continued)

(52) U.S. Cl.
CPC . *B66B 1/34* (2013.01); *B66B 1/468* (2013.01); *G06F 7/02* (2013.01); *B66B 2201/4615* (2013.01); *B66B 2201/4676* (2013.01)

(58) Field of Classification Search
CPC ............ G06F 7/02; B66B 1/34; B66B 1/468; B66B 7/02; B66B 2201/4615; B66B 2201/4676
USPC .................. 187/247, 380–389, 391, 393, 396
See application file for complete search history.

(56) References Cited

U.S. PATENT DOCUMENTS 6,707,374 B1 * 3/2004 Zaharia ................. 340/5.31
7,190,256 B2 * 3/2007 Pieper ..................... 340/5.7
(Continued)

FOREIGN PATENT DOCUMENTS

| JP | 2002-128404 A | 5/2002 |
| JP | 2002 348053 | 12/2002 |

(Continued)

OTHER PUBLICATIONS

International Search Report Issued May 10, 2011 in PCT/JP10/65598 Filed Sep. 10, 2010.

(Continued)

*Primary Examiner* — Anthony Salata
(74) *Attorney, Agent, or Firm* — Oblon, McClelland, Maier & Neustadt, L.L.P.

(57) ABSTRACT

Provided is an operation device for an elevator, which is capable of improving an operation efficiency of the elevator. The operation device includes: a landing destination-floor reservation device for storing, by input of personal-authentication information and destination-floor information thereto, the personal-authentication information to register a destination floor for a car; a car control device for raising and lowering the car based on information from the landing destination-floor reservation device; and a user restriction device to which personal-authentication information is input, for checking the input personal-authentication information against the personal-authentication information input to the landing destination-floor reservation device to restrict boarding of a user on the car.

6 Claims, 4 Drawing Sheets

(51) Int. Cl.
*B66B 1/46* (2006.01)
*G06F 7/02* (2006.01)

(56) References Cited

U.S. PATENT DOCUMENTS

| | | | | |
|---|---|---|---|---|
| 7,353,915 | B2* | 4/2008 | Zaharia et al. | 187/388 |
| 7,581,622 | B2* | 9/2009 | Amano | 187/384 |
| 7,712,586 | B2* | 5/2010 | Legez | 187/391 |
| 8,020,672 | B2* | 9/2011 | Lin et al. | 187/392 |
| 8,047,334 | B2* | 11/2011 | Christy et al. | 187/384 |
| 8,061,485 | B2* | 11/2011 | Finschi | 187/384 |
| 8,490,754 | B2* | 7/2013 | Amano | 187/384 |
| 8,813,917 | B2* | 8/2014 | Salmikuukka et al. | 187/384 |
| 8,857,569 | B2* | 10/2014 | Friedli | 187/384 |
| 8,910,752 | B2* | 12/2014 | Furutani | 187/384 |
| 2003/0085079 | A1 | 5/2003 | Koehler et al. | |
| 2011/0061975 | A1* | 3/2011 | Nakashima | 187/247 |

FOREIGN PATENT DOCUMENTS

| | | |
|---|---|---|
| JP | 2003 276961 | 10/2003 |
| JP | 2005 119877 | 5/2005 |
| JP | 2007 169030 | 7/2007 |
| JP | 2008-56361 A | 3/2008 |
| JP | 4312516 | 8/2009 |
| JP | 4484538 | 6/2010 |
| WO | 01 72621 | 10/2001 |
| WO | WO 2010/018616 A1 | 2/2010 |
| WO | WO 2010/023723 A1 | 3/2010 |

OTHER PUBLICATIONS

Office Action issued Nov. 26, 2013 in Japanese Patent Application No. 2012-532813 with English language translation.

Office Action issued Feb. 17, 2014 in Korean Application No. 10-2013-7005563 (With English Translation).

Combined Chinese Office Action and Search Report issued Mar. 17, 2014 in Patent Application No. 201080069031.2 with English Translation and English Translation of Category of Cited Documents.

* cited by examiner

OPERATION DEVICE FOR AN ELEVATOR THAT INCLUDES AN ELEVATOR ACCESS RESTRICTION DEVICE

TECHNICAL FIELD

The present invention relates to an operation device for an elevator, which raises and lowers a car.

BACKGROUND ART

Conventionally, there is known an operation device for an elevator, which includes a landing destination-floor reservation device for calculating, by input of personal-authentication information and destination-floor information thereto, the number of booked users based on the personal-authentication information to register a destination floor for a car based on the destination-floor information. The operation device for the elevator controls the raising and lowering of the car based on information of the number of booked users and the information of the registered destination floor, thereby improving an operation efficiency of the elevator (for example, see Patent Literature 1).

CITATION LIST

Patent Literature
Patent Literature 1: JP 2005-119877 A

SUMMARY OF INVENTION

Technical Problem

When the car is filled to capacity by boarding of a user who has not operated the landing destination-floor reservation device on the car, however, the car stops at a landing where there is the user who has operated the landing destination-floor reservation device even though the user cannot subsequently board the car. Therefore, there is a problem in that the operation efficiency of the elevator is lowered.

The present invention is to provide an operation device for an elevator, which is capable of improving an operation efficiency of the elevator.

Solution to Problem

An operation device for an elevator according to the present invention includes: a landing destination-floor reservation device for storing, by input of personal-authentication information and destination-floor information thereto, the personal-authentication information to register a destination floor for a car; a car control device for raising and lowering the car based on information from the landing destination-floor reservation device; and a user restriction device to which personal-authentication information is input, for checking the input personal-authentication information against the personal-authentication information input to the landing destination-floor reservation device to restrict boarding of a user on the car.

Advantageous Effects of Invention

The operation device for the elevator according to the present invention includes the user restriction device, to which the personal-authentication information is input, for checking the input personal-authentication information against the personal-authentication information input to the landing destination-floor reservation device to restrict the boarding of the user on the car. Therefore, the user can be prevented from boarding the car without operating the landing destination-floor reservation device. As a result, the operation efficiency of the elevator can be improved.

DESCRIPTION OF EMBODIMENTS

Hereinafter, embodiments of the present invention are described referring to the drawings. In the drawings, the same or equivalent members and parts are denoted by the same reference numerals for description.

First Embodiment

Figure 1:
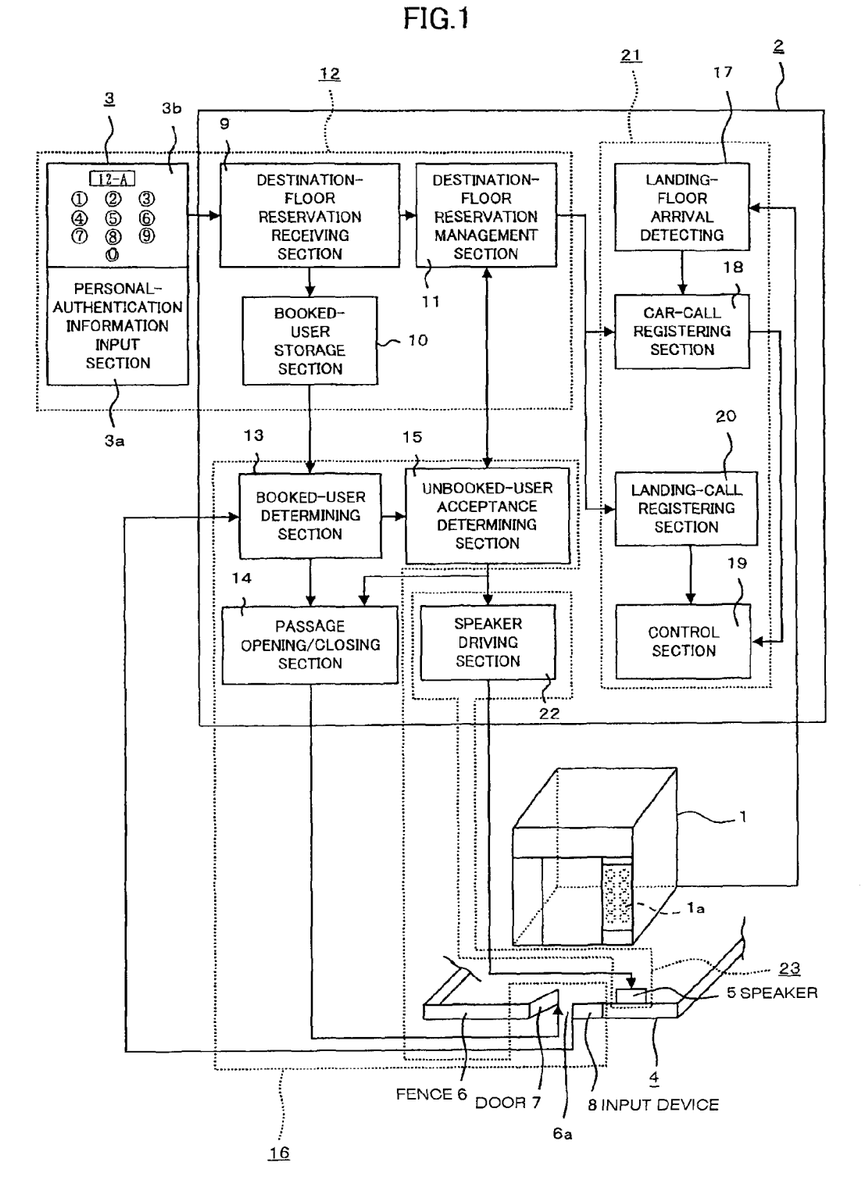
FIG. 1 A configuration diagram illustrating an elevator according to a first embodiment of the present invention.

FIG. 1 is a configuration diagram illustrating an elevator according to a first embodiment of the present invention. In the drawing, the elevator includes a car 1 to be raised and lowered in a hoistway, a control board 2 for controlling the raising and lowering of the car 1, a landing destination-floor reservation input device 3 provided at each floor, a user restriction device main body 4 provided to each landing, and a speaker 5 for making an announcement. The car 1 includes destination-floor buttons 1a to be operated by a user in the car 1.

The landing destination-floor reservation input device 3 is located in the landing or at a position away from the landing. The landing destination-floor reservation input device 3 includes a personal-authentication information input section 3a, to which personal-authentication information is input, and a destination-floor information input section 3b, to which destination-floor information is input. The personal-authentication information is input to the personal-authentication information input section 3a by using a fingerprint of the user, a card for identifying the user, or the like. By inputting a destination-floor number by the user, the destination-floor information is input to the destination-floor information input section 3b. The landing destination-floor reservation input device 3 may be the landing destination-floor reservation input device 3 to which the destination-floor information is input after the personal-authentication information is input, for example, a button with a fingerprint authentication information input device, a numerical keypad with a card reader, a security gate, or the like.

The user restriction device main body 4 includes a fence 6 surrounding a landing doorway, through which a passage 6a is formed, a door 7 for opening and closing the passage 6a, an input device 8 for a user restriction device (destination-floor input device), to which the personal-authentication information and the destination-floor information are input, and a passage detection section (not shown) for detecting the passage of the user through the passage 6a. Similarly to the landing destination-floor reservation input device 3, the input device 8 for the user restriction device includes a personal-authentication information input section and a destination-floor information input section.

The personal-authentication information and the destination-floor information input to the landing destination-floor reservation input device 3 are transmitted to a destination-floor reservation receiving section 9. The destination-floor reservation receiving section 9 transmits the personal-authentication information transmitted from the landing destination-floor reservation input device 3 to a booked-user storage section 10. The booked-user storage section 10 stores the personal-authentication information transmitted from the destination-floor reservation receiving section 9.

When transmitting the personal-authentication information and the destination-floor information to the destination-floor reservation receiving section 9, the landing destination-floor reservation input device 3 simultaneously transmits landing-floor information indicating a landing floor, at which the landing destination-floor reservation input device 3 is provided, to the destination-floor reservation receiving section 9. The destination-floor reservation receiving section 9 transmits the destination-floor information and the landing-floor information transmitted from the landing destination-floor reservation input device 3 to a destination-floor reservation management section 11.

The landing destination-floor reservation input device 3, the destination-floor reservation receiving section 9, the booked-user storage section 10, and the destination-floor reservation management section 11 constitute a landing destination-floor reservation device 12.

The personal-authentication information and the destination-floor information input to the input device 8 for the user restriction device are transmitted to a booked-user determining section 13. The personal-authentication information stored in the booked-user storage section 10 is to be transmitted to the booked-user determining section 13. The booked-user determining section 13 checks the personal-authentication information transmitted from the booked-user storage section 10 against the personal-authentication information transmitted from the input device 8 for the user restriction device. The booked-user determining section 13 transmits a passage closing/opening signal to a passage opening/closing section 14 based on the result of check. The passage opening/closing section 14 turns the door 7 to open/close the passage 6a formed through the fence 6 based on the passage opening/closing signal.

The destination-floor information transmitted to the booked-user determining section 13 is transmitted to an unbooked user acceptance determining section 15. The destination-floor information managed by the destination-floor reservation management section 11 is to be transmitted to the unbooked user acceptance determining section 15. The unbooked-user acceptance determining section 15 checks the destination-floor information transmitted from the destination-floor reservation management section 11 against the destination-floor information transmitted from the booked-user determining section 13. The unbooked-user acceptance determining section 15 transmits the passage opening/closing signal to the passage opening/closing section 14 based on the result of check.

The user restriction device main body 4, the booked-user determining section 13, the passage opening/closing section 14, and the non-booked user acceptance determining section 15 constitute a user restriction device 16.

By the arrival of the car 1 at the landing, a landing-floor arrival detecting section 17 detects the arrival of the car 1 at the landing. The landing-floor arrival detecting section 17 transmits car-arrival information indicating the arrival of the car 1 at the landing to a car-call registering section 18. The destination-floor information is to be transmitted from the destination-floor reservation management section 11 to the car-call registering section 18. By receiving the car-arrival information, the car-call registering section 18 transmits car-call registration information to a control section 19 based on the destination-floor information transmitted from the destination-floor reservation management section 11. The control section 19 registers a car call based on the car-call registration information transmitted from the car-call registering section 18.

Landing-floor information transmitted to the destination-floor reservation management section 11 is transmitted to a landing-call registering section 20. The landing-call registering section 20 transmits landing-call registration information to the control section 19 based on the landing floor information transmitted from the destination-floor reservation management section 11. The control section 19 registers a landing call based on the landing-call registration information transmitted from the landing-call registering section 20.

The landing-floor arrival detecting section 17, the car-call registering section 18, the control section 19, and the landing-call registering section 20 constitute a car control device 21.

The unbooked-user acceptance determining section 15 transmits announcement start information indicating the start of an announcement to a speaker driving section 22 based on the result of check of the destination-floor information transmitted from the destination-floor reservation management section 11 against the destination-floor information transmitted from the booked-user determining section 13. The speaker driving section 22 allows the speaker 5 to make an announcement for prompting the input of the personal-authentication information and the destination-floor information to the landing destination-floor reservation device 12 based on the announcement start information.

The speaker 5 and the speaker driving section 22 constitute a speech generation device 23.

The landing destination-floor reservation device 12, the user restriction device 16, the car control device 21, and the speech generation device 23 constitute an operation device for the elevator.

The destination-floor reservation receiving section 9, the booked-user storage section 10, the destination-floor reservation management section 11, the booked-user determining section 13, the passage opening/closing section 14, the unbooked-user acceptance determining section 15, the landing-floor arrival detecting section 17, the car-call registering section 18, the control section 19, the landing-call registering section 20, and the speaker driving section 22 are contained in the control board 2.

Figure 2:
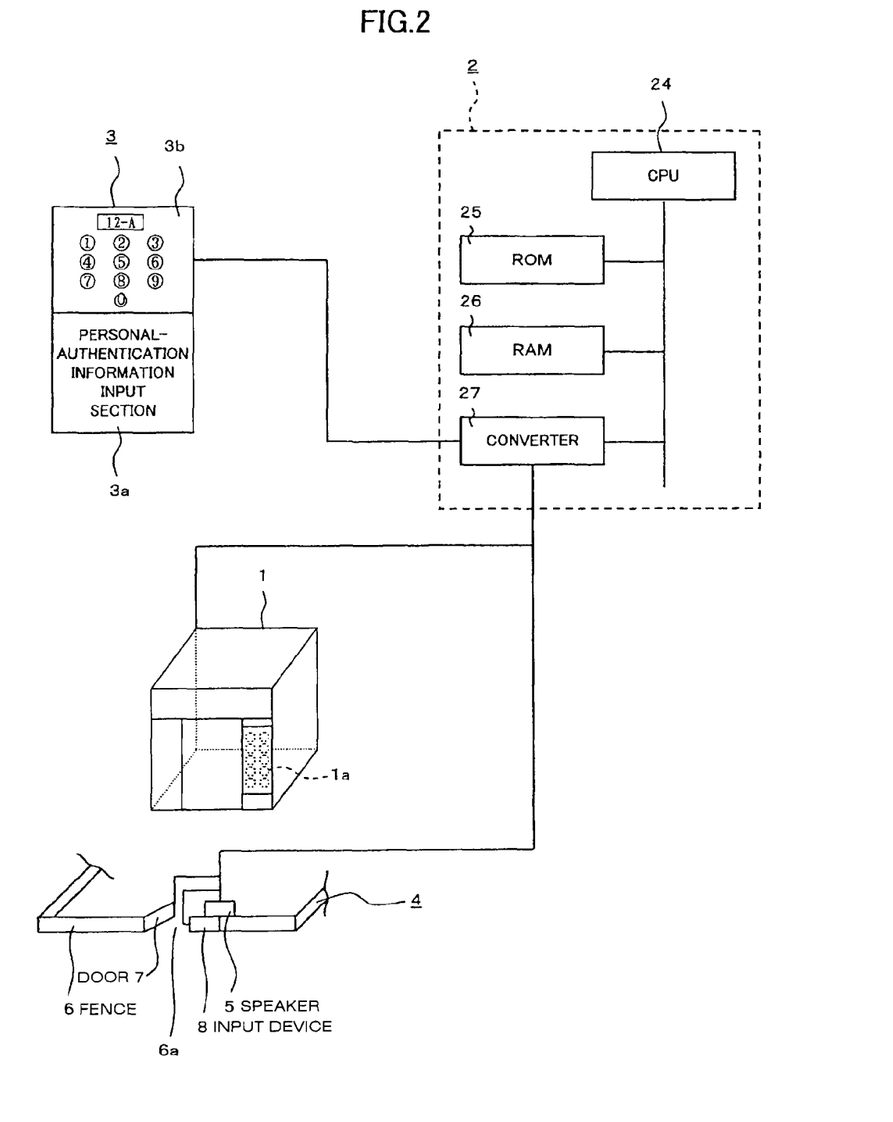
FIG. 2 A block diagram illustrating an operation device for the elevator illustrated in FIG. 1.

FIG. 2 is a block diagram illustrating the operation device for the elevator, illustrated in FIG. 1. The control board 2 includes a central processing unit (CPU) 24, a read-only memory (ROM) 25 in which an operation program is stored, a memory (RAM) 26 for storing data necessary for the control of the car 1, and a converter 27. The destination-floor buttons 1a, the landing destination-floor reservation input device 3, the speaker 5, the door 7, and the input device 8 for the user restriction device are connected to the converter 27. In the converter 27, input signals from the destination-floor buttons 1a, the landing destination-floor reservation input device 3, the speaker 5, the door 7, and the input device 8 for the user restriction device to the central processing unit 24 are converted, whereas output signals from the central processing unit 24 to the destination-floor buttons 1a, the landing destination-floor reservation input device 3, the speaker 5, the door 7, and the input device 8 for the user restriction device are converted.

Figure 3:
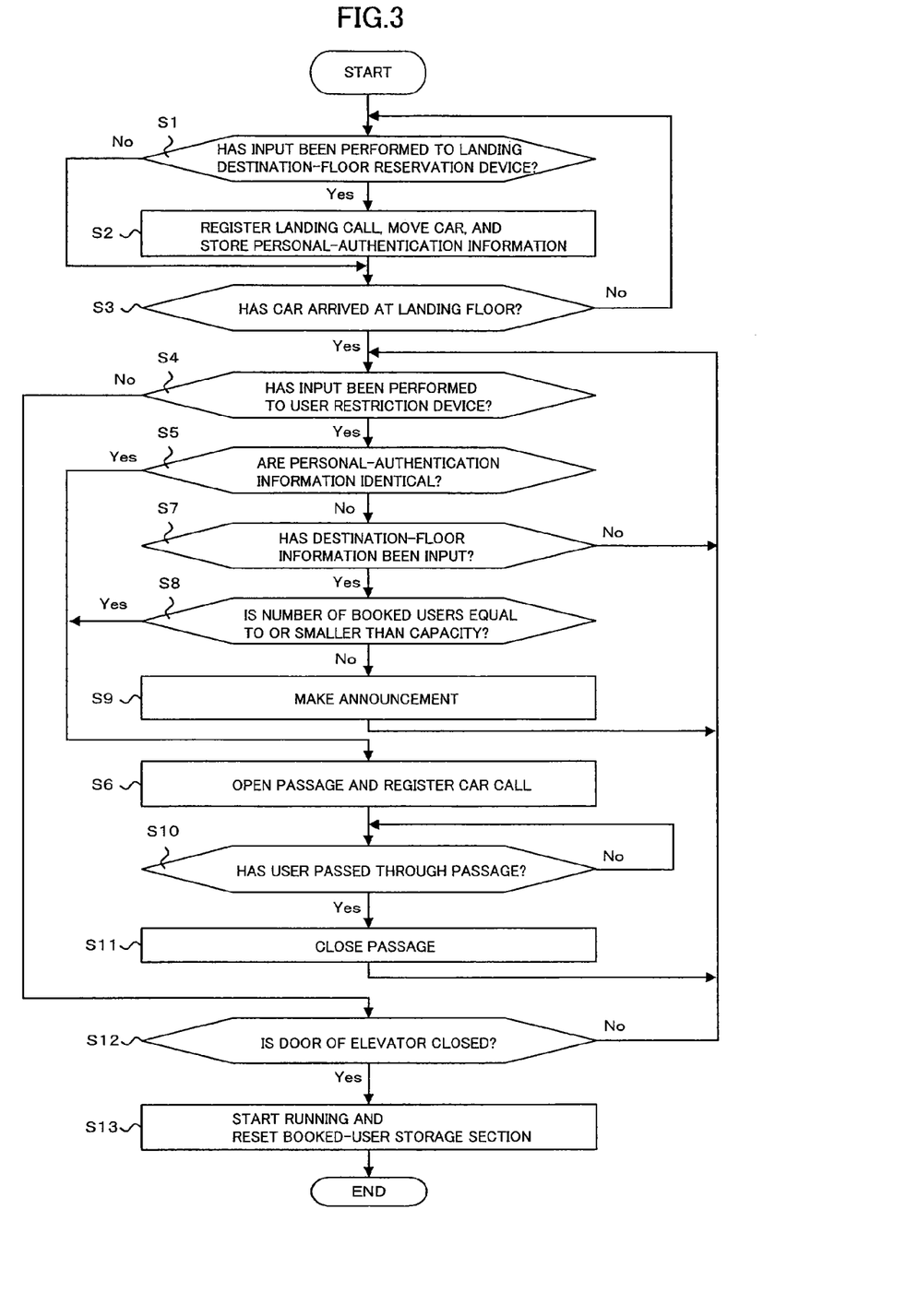
FIG. 3 A flowchart illustrating an operation of the operation device for the elevator illustrated in FIG. 1.

Next, an operation is described. FIG. 3 is a flowchart illustrating an operation of the operation device for the elevator, illustrated in FIG. 1. A control program illustrated in the flowchart is mounted on the control board 2. First, the landing destination-floor reservation device 12 determines whether or not the personal-authentication information and the destination-floor information have been input to the landing destination-floor reservation device 12 (Step S1).

When the landing destination-floor reservation device 12 determines that the personal-authentication information and the destination-floor information have been input to the landing destination-floor reservation device 12 in Step S1, the car control device 21 registers the landing call, and the landing destination-floor reservation device 12 stores the input personal-authentication information as personal-authentication information of the booked user (Step S2).

Thereafter, the car control device 21 determines whether or not the car 1 has arrived at the landing floor (Step S3). When the car control device 21 determines that the car 1 has not arrived at the landing floor in Step S3, the processing returns to Step S1. When the car control device 21 determines that the car 1 has arrived at the landing floor in Step S3, the user restriction device 16 determines whether or not the personal-authentication information has been input to the user restriction device 16 (Step S4).

When the user restriction device 16 determines that the personal-authentication information has been input to the user restriction device 16 in Step S4, the user restriction device 16 determines whether or not the personal-authentication information input to the landing destination-floor reservation device 12 and the personal-authentication information input to the user restriction device 16 are identical with each other (Step S5).

When the user restriction device 16 determines that the personal-authentication information input to the landing destination-floor reservation device 12 and the personal-authentication information input to the user restriction device 16 are identical with each other in Step S5, the user restriction device 16 opens the passage 6a and the car control device 21 registers the car call (Step S6).

On the other hand, when the user restriction device 16 determines that the personal-authentication information input to the landing destination-floor reservation device 12 and the personal-authentication information input to the user restriction device 16 are not identical with each other in Step S5, the user restriction device 16 determines whether or not the destination-floor information has been input to the user restriction device 16 (Step S7).

When the user restriction device 16 determines that the destination-floor information has not been input to the user restriction device 16 in Step S7, the processing returns to Step S4. On the other hand, when the user restriction device 16 determines that the destination-floor information has been input to the user restriction device 16 in Step S7, the user restriction device 16 determines whether or not the number of booked users is equal to or smaller than a capacity (Step S8).

When the user restriction device 16 determines that the number of booked users is equal to or smaller than the capacity in Step S8, the processing proceeds to Step S6. On the other hand, when the user restriction device 16 determines that the number of booked users is not equal to or smaller than the capacity in Step S8, an announcement for prompting the input of the personal-authentication information and the destination-floor information to the landing destination-floor reservation device 12 is made by the speech generation device 23 (Step S9). Then, the processing returns to Step S4.

After Step S6, the user restriction device 16 determines whether or not the user has passed through the passage 6a (Step S10). When the user restriction device 16 determines that the user has not passed through the passage 6a, Step S10 is repeated. On the other hand, when the user restriction device 16 determines that the user has passed through the passage 6a in Step S10, the user restriction device 16 closes the passage 6a (Step S11). Then, the processing returns to Step S4.

When the user restriction device 16 determines that the personal-authentication information has not been input to the user restriction device 16 in Step S4, the car control device 21 determines whether or not the doorway of the car 1 is closed (Step S12). When the car control device 21 determines that the doorway of the car 1 is not closed in Step S12, the processing returns to Step S4. When the car control device 21 determines that the doorway of the car 1 is closed in Step S12, the raising and lowering of the car 1 is started and the personal-authentication information stored in the landing destination-floor reservation device 12 is erased (the booked-user storage section 10 is reset) (Step S13). By the processing described above, the operation of the operation device for the elevator from the start of the operation of the landing destination-floor reservation device 12 to the boarding of the user on the car 1 is terminated.

As described above, the operation device for the elevator according to the first embodiment of the present invention includes the user restriction device 16, to which the personal-authentication information is input, for checking the input personal-authentication information against the personal-authentication information input to the landing destination-floor reservation device 12 to restrict the boarding of the user on the car 1. Therefore, the user can be prevented from boarding the car 1 without operating the landing destination-floor reservation device 12. As a result, the operation efficiency of the elevator can be improved.

Moreover, there is further provided the speech generation device 23 for making the announcement for prompting the input of the personal-authentication information and the destination-floor information to the landing destination-floor reservation device 12 when the personal-authentication information input to the landing destination-floor reservation device 12 and the personal-authentication information input to the user restriction device 16 are not identical with each other. Therefore, the user can be more reliably caused to operate the landing destination-floor reservation device 12.

Further, the user restriction device 16 does not allow the user to board the car 1 when the personal-authentication information input to the landing destination-floor reservation device 12 and the personal-authentication information input to the user restriction device 16 are not identical with each other. Therefore, the user can be reliably prevented from boarding the car 1 without operating the landing destination-floor reservation device 12.

Further, the landing destination-floor reservation device 12 calculates the number of users in the car 1 based on the stored personal-authentication information, whereas the user restriction device 16 allows the user to board the car 1 when the number of persons in the car 1 is equal to or smaller than the capacity. Therefore, when the car 1 is not full, the user who has not operated the landing destination-floor reservation device 12 can board the car 1. As a result, an operation efficiency of the elevator can be further improved.

In the first embodiment described above, there has been described the operation device for the elevator, which allows the user who has not operated the landing destination-floor reservation device 12 to board the car 1 when the number of persons in the car 1 is equal to or smaller than the capacity. However, the operation device for the elevator may prevent the user who has not operated the landing destination-floor reservation device 12 from boarding the car 1 regardless of whether or not the number of persons in the car 1 is equal to or smaller than the capacity.

Moreover, the input device 8 for the user restriction device, including both the personal-authentication information input section and the destination-floor information input section, has been described as an example in the first embodiment described above. However, the input device for the user restriction device may include only the personal-authentication information input device without including the destination-floor information input section. In this case, the user who boards the car 1 without operating the landing destination-floor reservation device 12 operates the destination-floor buttons 1a of the car 1.

Second Embodiment

Figure 4:
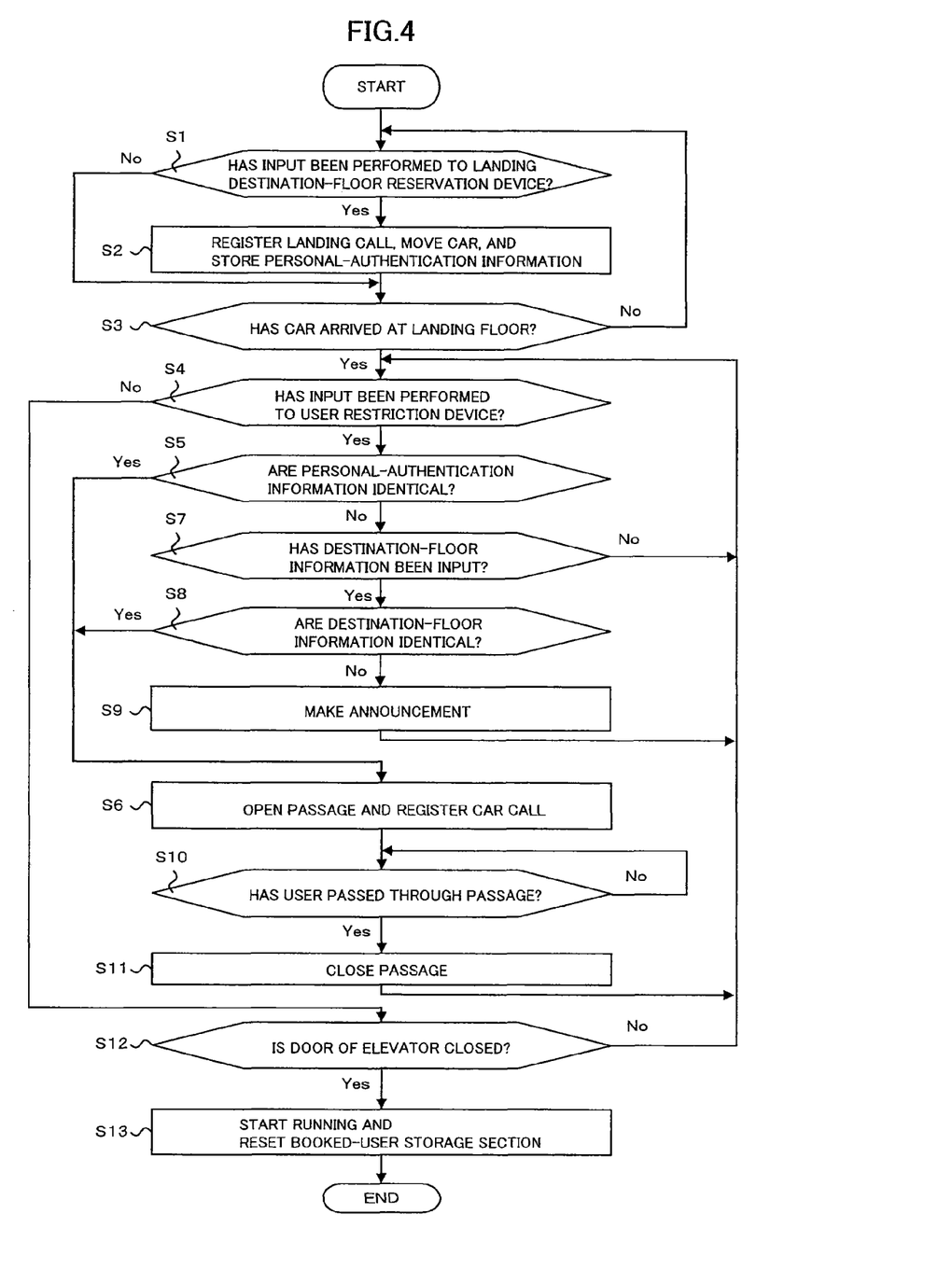
FIG. 4 A flowchart illustrating an operation of the operation device for the elevator, according to a second embodiment of the present invention.

FIG. 4 is a flowchart illustrating an operation of the operation device for the elevator, according to a second embodiment of the present invention. In the operation device for the elevator according to the second embodiment of the present invention, when the user restriction device 16 determines that the personal-authentication information input to the landing destination-floor reservation device 12 and the personal-authentication information input to the user restriction device 16 are not identical with each other in Step S5, the user restriction device 16 determines whether or not the destination-floor information has been input to the user restriction device 16 (Step S7).

When the user restriction device 16 determines that the destination-floor information has been input to the user restriction device 16 in Step S7, the user restriction device 16 determines whether or not the destination-floor information input to the landing destination-floor reservation device 12 and the destination-floor information input to the user restriction device 16 are identical with each other (Step S8). When the user restriction device 16 determines that the destination-floor information input to the landing destination-floor reservation device 12 and the destination-floor information input to the user restriction device 16 are identical with each other in Step S8, the processing proceeds to Step S6 as in the case of the first embodiment. On the other hand, when the user restriction device 16 determines that the destination-floor information input to the landing destination-floor reservation device 12 and the destination-floor information input to the user restriction device 16 are not identical with each other in Step S8, the processing proceeds to Step S9 as in the case of the first embodiment.

When the user restriction device 16 determines that the destination-floor information has not been input to the user restriction device 16 in Step S7, the processing returns to Step S4. The remaining operation is the same as that of the first embodiment.

As described above, according to the operation device for the elevator, of the second embodiment of the present invention, the user restriction device 16 includes the input device 8 for the user restriction device, to which the destination-floor information is input. When the destination-floor information input to the landing destination-floor reservation device 12 and the destination-floor information input to the input device 8 for the user restriction device are identical with each other, the user is allowed to board the car 1. Therefore, even a user without having operated the landing destination-floor reservation device 12 can board the car 1 when traveling to the registered destination floor. As a result, the operation efficiency of the elevator can be further improved.

In the second embodiment described above, there has been described the operation device for the elevator, which allows even the user without having operated the landing destination-floor reservation device 12 to board the car 1 when traveling to the registered destination floor. However, the operation device for the elevator may prevent the user without having operated the landing destination-floor reservation device 12 from boarding the car 1 regardless of whether or not the user without having operated the landing destination-floor reservation device 12 is to travel to the registered destination floor.

Further, in the embodiments described above, the speech generation device 23 for making an announcement for prompting the input of the personal-authentication information and the destination-floor information to the landing destination-floor reservation device 12 has been described as an example. However, the speech generation device may generate a warning buzzer sound for informing the user that boarding is not allowed.

REFERENCE SIGNS LIST

1 car, 1a destination-floor button, 2 control board, 3 landing destination-floor reservation input device, 3a personal-authentication information input section, 3b destination-floor information input section, 4 user restriction device main body, 5 speaker, 6 fence, 6a passage, 7 door, 8 input device for user restriction device, 9 destination-floor reservation receiving section, 10 booked-user storage section, 11 destination-floor reservation management section, 12 landing destination-floor reservation device, 13 booked-user determining section, 14 passage opening/closing section, 15 unbooked user acceptance determining section, 16 user restriction device, 17 landing-floor arrival detecting section, 18 car-call registering section, 19 control section, 20 landing-call registering section, 21 car control device, 22 speaker driving section, 23 speech generation device, 24 central processing unit, read-only memory, 26 memory, 27 converter

The invention claimed is:

1. An operation device for an elevator, comprising:
   a landing destination-floor reservation device for storing, by input of personal-authentication information and destination-floor information thereto, the personal-authentication information to register a destination floor for a car;
   a car control device for raising and lowering the car based on information from the landing destination-floor reservation device; and
   a user restriction device to which personal-authentication information is input, for checking the input personal-authentication information against the personal-authentication information input to the landing destination-floor reservation device to restrict boarding of users on the car for each of the users that have input personal-authentication information to each of the landing destination-floor reservation device and the user restriction device.

2. An operation device for an elevator according to claim 1, further comprising a speech generation device for making an announcement for prompting input of the personal-authentication information and the destination-floor information to the landing destination-floor reservation device when the personal-authentication information input to the landing destination-floor reservation device and the personal-authentication information input to the user restriction device are not identical with each other.

3. An operation device for an elevator according to claim 1, wherein the user restriction device does not allow a user to board the car when the personal-authentication information input to the landing destination-floor reservation device and the personal-authentication information input to the user restriction device are not identical with each other for the user.

4. An operation device for an elevator according to claim 1, wherein the user restriction device includes a destination-floor input device, to which destination-floor information is input, and allows a user to board the car when the destination-floor information input to the landing destination-floor reservation device and the destination-floor information input to the destination-floor input device are identical with each other for the user.

5. An operation device for an elevator according to claim 1, wherein:
   the landing destination-floor reservation device calculates a number of the users in the car based on the stored personal-authentication information; and
   the user restriction device allows a user to board the car when the number of the users is equal to or smaller than a capacity.

6. An operation device for an elevator according to claim 2, wherein the user restriction device does not allow a user to board the car when the personal-authentication information input to the landing destination-floor reservation device and the personal-authentication information input to the user restriction device are not identical with each other for the user.

* * * * *